Figure 1:
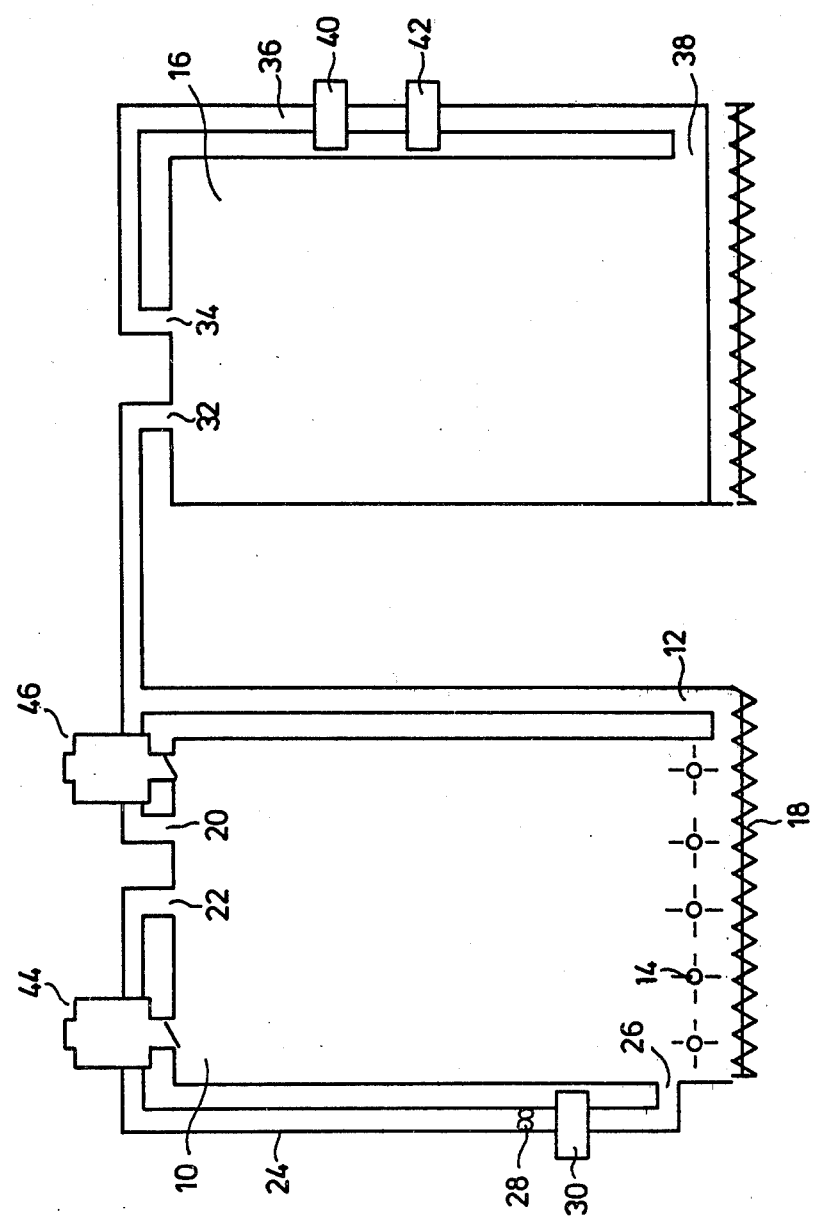

United States Patent [19]

Roediger

[11] Patent Number: 4,482,633
[45] Date of Patent: Nov. 13, 1984

[54] METHOD AND APPARATUS FOR AEROBIC DECOMPOSITION OF ORGANIC SOLIDS

[75] Inventor: Hanns Roediger, Stuttgart, Fed. Rep. of Germany

[73] Assignee: Techtransfer GmbH & Co. KG, Stuttgart, Fed. Rep. of Germany

[21] Appl. No.: 337,293

[22] Filed: Jan. 5, 1982

[51] Int. Cl.³ .............................................. C12M 1/12
[52] U.S. Cl. .................................... 435/311; 435/316
[58] Field of Search ................... 71/8, 9, 14; 422/116, 422/184, 232; 210/488, 489, 503, 197, 218, 219; 435/287, 311, 316

[56] References Cited

U.S. PATENT DOCUMENTS

| | | | |
|---|---|---|---|
| 2,820,985 | 1/1958 | Cresswell | 210/489 X |
| 4,135,908 | 1/1979 | Widmer | 71/9 |
| 4,184,269 | 1/1980 | Kneer | 71/9 X |
| 4,302,546 | 11/1981 | Schlichting, Jr. | 71/9 X |
| 4,392,881 | 7/1983 | Kneer | 71/9 |

Primary Examiner—Ferris H. Lander
Attorney, Agent, or Firm—Cushman, Darby & Cushman

[57] ABSTRACT

To ensure that with a method of aerobic decomposition of organic solids in which the solids to be composted are fed in the top of a compost tower and discharged from the bottom to be preferably re-used as a covering layer while a gaseous fluid containing oxygen is introduced into the compost tower, any odor nuissance is avoided, the fluid withdrawn from the compost tower after passing at least a part of the composing solids is returned to the decomposition tower independently on the pressure conditions prevailing in said decomposition tower, wherefrom additionally results a process course more advantageous in terms of energy.

18 Claims, 2 Drawing Figures

METHOD AND APPARATUS FOR AEROBIC DECOMPOSITION OF ORGANIC SOLIDS

The invention concerns a method for aerobic decomposition of organic solids in which the composting solids are fed on the top of a decomposition tower and discharged from the bottom to be preferably reused as a covering layer, whereby a gaseous fluid containing oxygen is introduced into the decomposition tower.

With said method, a drier, preferably composted material can be blended to the solids to be composted, in the course of which the withdrawal of the composting solids is started only after the composting process temperature has achieved a certain level over a certain period of time.

Certainly, with said method, advantages have been achieved resulting, for instance, in an inactivation of pathogene, particularly parasitic organisms, in an extensive conservation of plant nutrients contained in the solids or in a conservation of purity of the material to be processed during the process, by avoiding supplement of extraneous additives, nevertheless, the problem of nuissance by odors has not completely been resolved even when providing the decomposition tower with a gas-permeable cover.

The intent of the invention presented herewith is to create said method in such a manner respectively to optimize it, that any odor nuissances are avoided caused by the gaseous fluid containing the oxygen necessary for the process, while simultaneously the process compared with the state-of-art should work more efficient in terms of energy.

This intent is resolved by the invention in a manner that the fluid withdrawn from the decomposition tower, after passing at least a part of the composting solids, is returned to the decomposition tower independently on the prevalent pressure conditions. In other words, the invention proposes to permitt the fluid necessary for the aerobic process, to flow through a circuit including the decomposition tower, independent on the pressure conditions between the internal space of the decomposition tower and the ambient air. By this means, it is ensured that no gas can escape out of control and, thus, any odor nuissance can be avoided. Because the fluid is flowing through a circuit, energy is saved thanks to the fact that, compared with the state-of-art, the decomposition tower has not to be always fed with fresh air having a temperature essentially lower compared to the fluid leaving the decomposition tower. Therefore, a plant using the method according to the invention, can be operated more economically. A further advantage results from the fact that the requirement of maintaining in the decomposition tower a nearly constant air humidity, can be better fulfilled due to the easier possibility to control the relative air humidity in the circulating fluid.

To ensure that even after the fluid has passed the circuit for several times, said fluid will still contain a sufficient quantity of oxygen, it is possible to add fresh gaseous fluid after a certain number of cycles. In a further arrangement of the invention it is provided to supply the gaseous fluid with a higher portion of oxygen, eventually by using pure oxygen as the fresh fluid to be added, to provide a temporary necessity of adding fresh fluid only.

A further advantage by using the method of fluid circulation results from the fact that the fluid is filtered by passing several times the composting solids (filtration effect of the composting solids) so that a quantity of used fluid equal to the quantity of added fresh fluid can be discharged into the ambient air without any additional treatment.

An installation to perform the aforementioned method with a decomposition tower, with a support surface means near the bottom, said support surface means comprising a roller grid, as well as devices for an eventual recycle of withdrawn composting solids and/or for blending said composting solids preferably with drier own material, is characterized by the design that for achieving a closed circuit for the fluid passing the said decomposition tower, a duct is leading from the top part of the said decomposition tower, destinated for withdrawal of the said fluid, which is introduced into a lower part of the decomposition tower for the purpose of recirculation of the said fluid into the said decomposition tower whereby said recirculation is performed preferably into the bottom part of the said decomposition tower.

To maintain the recirculation of said fluid in a closed circuit, recirculation devices, preferably consisting of fans, are arranged in the duct. Besides, the duct may contain devices for drying and/or humidify said fluid, to ensure the maintenance of a nearly constant relative air humidity inside of said decomposition tower.

To enable a controled discharge of exhaust air and occasionally to treat said air, in one design of said installation it is proposed to equip said decomposition tower with at least one lockable exhaust air device, in which said device a treatment unit preferably designed as a wettable filter is arranged in such a manner that the exhaust air shall flow through this treatment unit before being exhausted into the ambient air. Besides, said exhaust air device comprises at least one cylindrical section wherein the said wettable filter is co-axial arranged, said wettable filter preferably wettened by a liquid and comprises a plastic fabric pack arranged between two, preferably stainless-steel made wire nettings.

By wettening the filter with a liquid is is ensured that an improved treatment of the exhaust air takes place while by adding, for instance, diluted soda lye some odorous substances still present in said exhaust air can be bound. Beneath the filter is located a collecting channel destinated for controlled drainage of said wettening liquid as well as the moisture condensed from the exhaust air, for instance, to reuse said moisture for rewettening of the air in circulation. The exhaust air device can be locked on its side directed towards said decomposition tower by means of hydraulically operated butterfly valves to maintain the complete circulation according to the invention independently on any pressure conditions prevailing inside or outside of said decomposition tower.

Said decomposition tower is preferably equipped with two of said exhaust air devices arranged in the top part of said decomposition tower composed of cylindrical sections with various diameters.

In a further, particularly to be pointed-out design of said invention is, after said decomposition tower, arranged in a manner according to state of art a drying tower, in which said drying tower another gaseous fluid is circulated in a closed circuit to achieve drying of the material piled in said drying tower. The duct necessary for said operation is leading from the top part of said tower and is preferably introduced into the bottom part of said tower. In said duct further devices are provided to withdraw moisture from said fluid circulated and recycled into said decomposition tower. Said devices in which said moisture from said fluid is condensed can consist of caloric pumps according to another design proposed by said invention. In such case, the energy nascent by condensation is returned to said fluid to achieve an optimum process course in terms of energy. Besides, the closed circuit ensures that said fluid used for said drying process cannot leave said drying tower uncontrolled and, thus, cause odor nuissances, too.

To adjust the temperature of said fluid circulating in said closed circuit on a certain level optimal for drying, thermal energy can be added to said fluid after moisture removal by means of another caloric pump arranged in said circuit, wherein said energy is withdrawn by said caloric pump, for instance, from the ambient air.

Further details, advantages and characteristics of said invention are demonstrated on the application example shown in the drawing.

Figure 2:
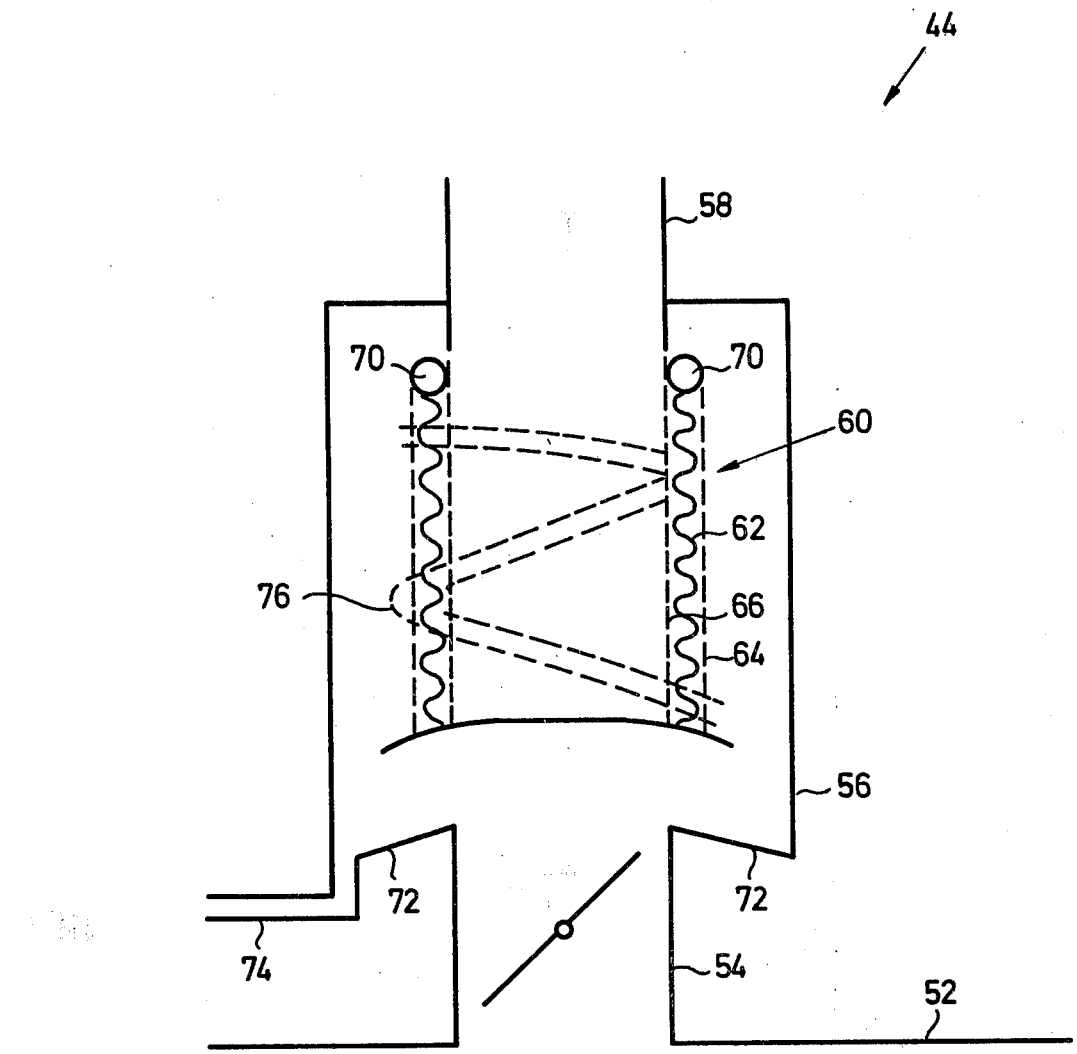

Shown are:

FIG. 1 schematic scetch of an installation for aerobic decomposition of organic solids and FIG. 2 an exhaust air device destinated for a decomposition tower.

The organic solids to be fed into a decomposition tower 10 can be token from dewatering devices as are, for instance, roller presses, centrifuges or similar machines, to be mixed with preferably previously decomposed and dried organic material to improve aerobic decomposition. Further, the material is introduced via a duct 12 into the top part of said decomposition tower 10 and piled there. In the bottom part of said decomposition tower 10 a support surface is located preferably consisting of a roller grid 14. The material withdrawn from said decomposition tower 10 via the slot underneath the roller grate 14 can be either returned again into the decomposition tower 10 or, after a sufficient decomposition took place, piled into a drying tower 16 located in line after said decomposition tower 10.

The withdrawal of said material from the bottom of said decomposition tower 10 respectively the return of said material to said duct 12 by means of which the material can be either returned to said decomposition tower 10 or conveyed to said drying tower 16, is preferably performed by a flight conveyor 18 arranged in the bottom part of said decomposition tower 10. The transport via the duct 12 can be performed by means of usual conveying devices as, for instance, bucket elevators or equal.

Contrary to known decomposition towers, the decomposition tower 10 demonstrated in the application example according to the said invention can be completely disconnected by means of hydraulically operated butterfly valves. Besides, said tower contains two openings 20 and 22 connected with the duct, whereof the opening 20 is connected with the duct 12. The opening 22 is introduced into another duct 24, which said duct is introduced via an opening 26 into the bottom part of said decomposition tower 10. Via the duct 24 is circulated the fluid containing oxygen necessary for said aerobic decomposition, which said fluid is not, contrary to other known apparatus, exhausted at least partially into the ambient atmosphere after one single passage causing, thus, strong odor nuissances.

To enable said fluid to circulate in a closed circuit means through the said decomposition tower 10 and the parallely arranged duct 24, a circulation device, preferably consisting of a fan 28, is arranged in the said duct. Furthermore, in said duct 24 a device 30 is arranged by means of which the desired relative humidity of said fluid can be adjusted to ensure a nearly constant air humidity inside of said decomposition tower 10.

By means of said circulation of said gaseous fluid containing oxygen in a closed circuit independently on the pressure conditions prevailing inside of said decomposition tower as well as outside of said tower, further advantages are resulting by avoiding odor nuissances combined with said aerobic decomposition. Furthermore, energy consumption is lowered because said fluid circulating through said decomposition tower 10, has approximately the equal temperature as the material to be decomposed, meanwhile with known methods using only one passage of the fluid through the decomposition tower, a pre-heating of said fluid in an extent necessary is required. Another advantage is caused by the fact that said gaseous fluid can be artificially enriched with oxygen without any waste thanks to said multiple circulation through said decomposition tower.

As demonstrated schematically in FIG. 1, said decomposition tower 10 is completely disconnectable by means of the hydraulically operated butterfly valves 48 and 50, said valves simultaneously being parts of said exhaust air devices 44, 46 located in the top part of said decomposition tower 10. By means of said exhaust air devices 44 and 46, exhaust air can be controlable released, for instance than when new oxygen is required for aerobic decomposition, for example if new fresh air should be added into said decomposition tower 10.

In FIG. 2, an example of said exhaust air device is reproduced in an enlarged scale to demonstrate its construction. On the front area 52 of said decomposition tower 10, a stack-shaped device is arranged, comprising in the demonstrated example three cylindrical sections 54, 56 and 58, while in the section 54 turned to said decomposition tower 10 the butterfly valve 48 is arranged to ensure that no exhaust air is released via the exhaust air device 44 into ambient air, if not required.

With said butterfly valve 48 opened, exhaust air is led via said cylindrical section 54 and said cylindrical section 56 into the exit 58. Before the air enters said exit 58, said air has to pass through a filter 60, preferably arranged inside of said cylindrical section 56, co-axial to said section. Preferably said filter 60 is made as a wettable filter, consisting of plastic fabric packs 62 arranged between stainless-steel made wire nettings 64 and 66. In other words, said filter 60 represents also a cylindrical body through which body the exhaust air is flowing from outside to inside. For this purpose, the bottom area of said filter 60 is completely closed by a deflector plate 68.

To ensure that the exhaust air leaving said exhaust air device 44 is to a great extent free of moisture, said moisture is removed by condensation in said filter 60 by means of wettening said filter 60 via spray devices 70 arranged above the top part of said filter 60, with liquid as, for instance, water, preferably containing oder-binding substances as, for instance, diluted sody lye. Said liquid trickles now, for instance, over the plastic fabric 62 by means of which the moisture contained in said exhaust air flowing through said filter 60 and, thus, the particles bearing odors are eliminated. Now, the liquid can flow over the candelabering circular edge of said deflector plate 68 into the lower part of said cylindrical section 56 while the bottom area 72 of said cylindrical section 56 is inclined towards said decomposition tower 10 forming a collector for said liquid trickling from said filter 60, wherefrom said liquid can be drained via a duct 74 to be, for instance, either disposed for returned to the circuit of said fluid to adjust the desired relative humidity of said fluid.

To improve the condensation of moisture within said filter 60, this filter can be surrounded by a cooling device. In the example as demonstrated this cooling device 46 consists of spiral coils.

As shown in FIG. 1, said decomposition tower 10 is equipped with two exhaust air devices performed accordingly to FIG. 2. It is possible, of course, that only one of said exhaust air devices if sufficiently dimensioned or, on the other hand, more than two of them, could correspond to the requirements, i.e. to enable to release said exhaust air controled and in a desired quantitiy, from said decomposition tower 10, while simultaneously this should ensure that odor nuissances are completely avoided. As aforementioned, an elimination of odor-bearing particles occurs preferably when passing a filter, but can be also performed by any other kind of odor-binding measures.

After said decomposition tower 10 a drying tower 16 is arranged in line, as mentioned before, into which drying tower 16 sufficiently decomposed material is piled by means of the duct 12 via an opening 32. To ensure that the material is discharged from the bottom of said drying tower 16 with a desired dryness, it is necessary to lead through said drying tower a gaseous fluid, too, by means of providing this, according to the invention, in a closed circuit. For these purposes, a duct 36 is provided leading from an opening 34, arranged in the top part of said drying tower 16, back to the bottom part of said drying tower 16 via an opening 38. In said duct 36 devices 40 and 42 are arranged, by means of said device 40 moisture is withdrawn from the fluid flowing through said circuit. This withdrawal is performed by means of condensation. A proposal according to the invention provides said condensation by means of a caloric pump. The energy nascent from this condensation can be returned to said fluid.

Because of thermal energy losses occuring in the circulation process it is necessary to heat up again said fluid recycled to said drying tower 16 via said opening 38, according to the invention by means of a device 42 preferably consisting of another caloric pump, said pump withdrawing the energy from the environment.

As demonstrated in the example for an installation, for the first time a method respectively an apparatus for aerobic decomposition of organic solids, according to the theory of said invention, is proposed, in which the gaseous fluid required and necessary for said aerobic decomposition as well as the further fluid necessary and required for drying are flowing each in separate closed circuits. This circulation is possible even then if, for instance, the air pressure inside of said decomposition tower is higher as the outside pressure. Furthermore, a controled discharge of exhaust air can be performed in such a manner, that said decomposition tower is equipped with exhaust air devices preferably comprising contact or wettable filters, by means of which said filters the moisture present in the exhaust air can be extensively condensed and odor-bearing particles eliminated.

What is claimed is:

1. An apparatus for the aerobic decomposition of organic solids comprising a decomposition tower, support surface means near the bottom of said tower, said support surface means comprising a roller grid as well as means for resupplying of discharged solids to the decomposition tower for mixing the material to be decomposed with dried material previously being decomposed, a duct leading from the top of said decomposition tower and introduced on a lower located point into the decomposition tower serving to achieve a closed circuit for the fluid having passed said decomposition tower and for withdrawing from the top and recycling back into the lower portion of said decomposition tower, said duct including means for circulating the fluid, said decomposition tower including at least one closeable exhaust air device having means for cleaning the exhaust air, said cleaning means including a chamber having an inlet at one end thereof and an outlet at the opposite end, a deflector plate disposed in said chamber and a filter means extending between said deflector plate and said outlet, means located adjacent said outlet for wetting said filter means, said chamber having a drain conduit at the end thereof adjacent said inlet.

2. The apparatus as claimed in claim 1 wherein said filter means includes cooling means.

3. Apparatus according to claim 1 comprising means for controllably draining the liquid out of said filter whereby said liquid is adapted to be added to the circuit of said fluid to adjust the desired relative humidity of said fluid.

4. Apparatus according to claim 1, wherein said filter means comprises porous material.

5. Apparatus according to claim 4, wherein said filter means is artificially wettable.

6. An apparatus according to claim 4 wherein said porous material is arranged between a wire mesh of stainless steel.

7. An apparatus according to claim 4 wherein the porous material comprises plastic fabric packs.

8. An apparatus according to claim 7 wherein said plastic fabric packs are arranged between a wire mesh of stainless steel.

9. An apparatus according to claim 1 wherein the cooling means comprises coils arranged within the filter area.

10. An apparatus for the aerobic decomposition of organic solids comprising a decomposition tower, support surface means near the bottom of said tower said support surface means comprising a roller grid as well as means for resupplying of discharged solids to the decomposition tower for mixing the material to be decomposed with dried material previously being decomposed, a duct leading from the top of said decomposition tower and introduced on a lower located point into the decomposition tower serving to achieve a closed circuit for the fluid having passed said decomposition tower and for withdrawing from the top and recycling back into the lower portion of said decomposition tower, said duct including means for circulating the fluid, said apparatus further including a drying tower in fluid communication with said decomposition tower, said drying tower having conduit means for circulating in a closed circuit said fluid for drying of the materials deposited in said drying tower.

11. An apparatus according to claim 10, wherein said duct is introduced into the bottom part of said decomposition tower.

12. An apparatus according to claim 10 wherein the circulation means is a fan.

13. An apparatus according to claim 10, wherein said duct comprises devices for drying and/or humidifying said fluid.

14. An apparatus according to claim 13 wherein said duct is introduced into the bottom part of said decomposition tower.

15. Apparatus as claimed in claim 10 wherein said drying tower includes a duct extending from the top part thereof and connected to the bottom part of said drying tower, said duct for said drying tower including a device for removing humidity from fluid passing through said duct.

16. Apparatus according to claim 15, comprising means for reusing the energy obtained from removing the moisture from said fluid, for use with said fluid.

17. Apparatus as claimed in claim 15 wherein said means for removing humidity is a caloric pump.

18. Apparatus according to claim 17, wherein said duct comprises a further caloric pump arranged after the first caloric pump, wherein said further caloric pump serves for heating of said fluid.

* * * * *